(12) United States Patent
Vishnu et al.

(10) Patent No.: US 8,170,216 B2
(45) Date of Patent: May 1, 2012

(54) TECHNIQUES FOR VALIDATING AND SHARING SECRETS

(75) Inventors: Vardhan Itta Vishnu, Peddapalli (IN); H. B. Puthali, Bangalore (IN)

(73) Assignee: Apple Inc., Cupertino, CA (US)

( * ) Notice: Subject to any disclaimer, the term of this patent is extended or adjusted under 35 U.S.C. 154(b) by 952 days.

(21) Appl. No.: 12/141,286

(22) Filed: Jun. 18, 2008

(65) Prior Publication Data

US 2010/0005302 A1 Jan. 7, 2010

(51) Int. Cl.
*H04L 9/08* (2006.01)
(52) U.S. Cl. ....................................... 380/286
(58) Field of Classification Search .................... 380/286
See application file for complete search history.

(56) References Cited

U.S. PATENT DOCUMENTS

| | | | |
|---|---|---|---|
| 4,218,582 A | 8/1980 | Hellman et al. | |
| 5,841,865 A * | 11/1998 | Sudia ............................ | 380/286 |
| 6,307,936 B1 | 10/2001 | Ober et al. | |
| 6,959,086 B2 | 10/2005 | Ober et al. | |
| 7,016,494 B2 | 3/2006 | Hopkins et al. | |
| 7,054,444 B1 | 5/2006 | Paillier | |
| 7,248,692 B2 | 7/2007 | Seifert | |
| 2002/0041684 A1 | 4/2002 | Nishioka | |
| 2005/0123131 A1 | 6/2005 | Naccache et al. | |
| 2005/0226411 A1 | 10/2005 | Feyt et al. | |
| 2006/0291661 A1 | 12/2006 | Ramzan et al. | |
| 2008/0226064 A1 * | 9/2008 | Douguet et al. ............... | 380/30 |

* cited by examiner

*Primary Examiner* — Christian Laforgia
*Assistant Examiner* — Harris Wang
(74) *Attorney, Agent, or Firm* — Schwegman, Lundberg & Woessner, P.A.

(57) ABSTRACT

Techniques for validating and sharing secrets are presented. A secret is divided into a plurality of parts. Each part is represented by a unique value. Each value is distributed to a unique user that shares in the secret. The secret is recreated when each user presents each user's unique value. Each unique value is then used to recreate its corresponding part of the key and when all parts are present and validated, the secret is reproduced.

8 Claims, 3 Drawing Sheets

TECHNIQUES FOR VALIDATING AND SHARING SECRETS

BACKGROUND

Increasingly, the affairs of individuals and enterprises are being conducted over the Internet and via the World-Wide Web (WWW). This has provided for a geographically dispersed world economy and created many opportunities, which previously did not exist.

One major issue associated with conducting affairs over the WWW is security. Just as the WWW has grown, so too has the sophistication of the criminals that lurk on the Internet attempting to acquire passwords and other sensitive data of users as that data becomes exposed on the Internet during network transactions.

To address these concerns a variety of security mechanisms are typically used, such as a Public and Private Key Infrastructure (PKI) transactions, Virtual Private Networks (VPN's), and other key distribution and encryption techniques. Still, even these mechanisms are not full proof and each mechanism has its own security issues that have to be addressed because of the increasing sophistication of today's Internet hackers.

One particular approach, which is used for enhancing security, is to split a key into multiple pieces. Key splitting is particularly useful for a user when the user forgets his/her key. The original key can be split into pieces and then escrowed with multiple parties, such that each of the pieces from each escrow agent is needed to reassemble the key. Should the user ever forget the key and want to reacquire it, escrow agents supply their pieces and the key is reassembled for the user. Key splitting is also useful in other scenarios as well, such as when multiple parties are needed to access a secure asset, where each party includes a piece of an overall key needed to access that asset. Sometimes key splitting should also be done in such a way that if the key is divided into 'n' pieces and escrowed with multiple parties, then the original key should be able to be reassembled by using any 'k' escrow agents pieces, where k=n and should not be able to be reassembled into the original key by any number of pieces less than k.

However, conventional key splitting techniques do not validate the individual key pieces; rather, the entire re-assembled key having all the pieces is validated. The problem with this approach is that it is not efficient and cannot detect a problem before all the key pieces are acquired and reassembled; so, any issue with a key is only noted once a final version of the key is reassembled from all the individual pieces.

For these and other reasons, it can be seen that improved and automated techniques are desirable for validating and sharing secrets, such as keys.

SUMMARY

In various embodiments, techniques for validating and sharing secrets are presented. More specifically and in an embodiment, a method is provided for dividing a shared secret. A decision is made to divide a secret among a number of users 'n' and a minimum number of shares 'k' needed to reassemble the secret. A single value is calculated for each share, the single value permits each share to be independently validated from remaining shares and permits each share to be re-assembled with any 'k−1' remaining shares to reform the secret. Finally, each single value for each share is delivered to a particular one of the users. The users share the secret via each user's single value.

DETAILED DESCRIPTION

A "resource" as used herein refers to a service, an application, a processing environment, a user, a group of users, a role associated with a user or groups of users, a policy, a website, a proxy, a device, data or content, or various combinations of these things. A "secure resource" is one that requires authentication to permit access to it. The terms "instructions," "application," and "service" may be used interchangeably herein as a form of a resource that executes on a machine (processing device, such as a computer, etc.).

Various embodiments of this invention can be implemented in existing network architectures. For example, in some embodiments, the techniques presented herein are implemented in whole or in part in the Novell® network and proxy server products, directory products, operating system (OS) products, and/or identity based products, distributed by Novell®, Inc., of Provo, Utah.

Of course, the embodiments of the invention can be implemented in a variety of architectural platforms, OS and server systems, or applications. Any particular architectural layout or implementation presented herein is provided for purposes of illustration and comprehension only and is not intended to limit aspects of the invention.

Figure 1:
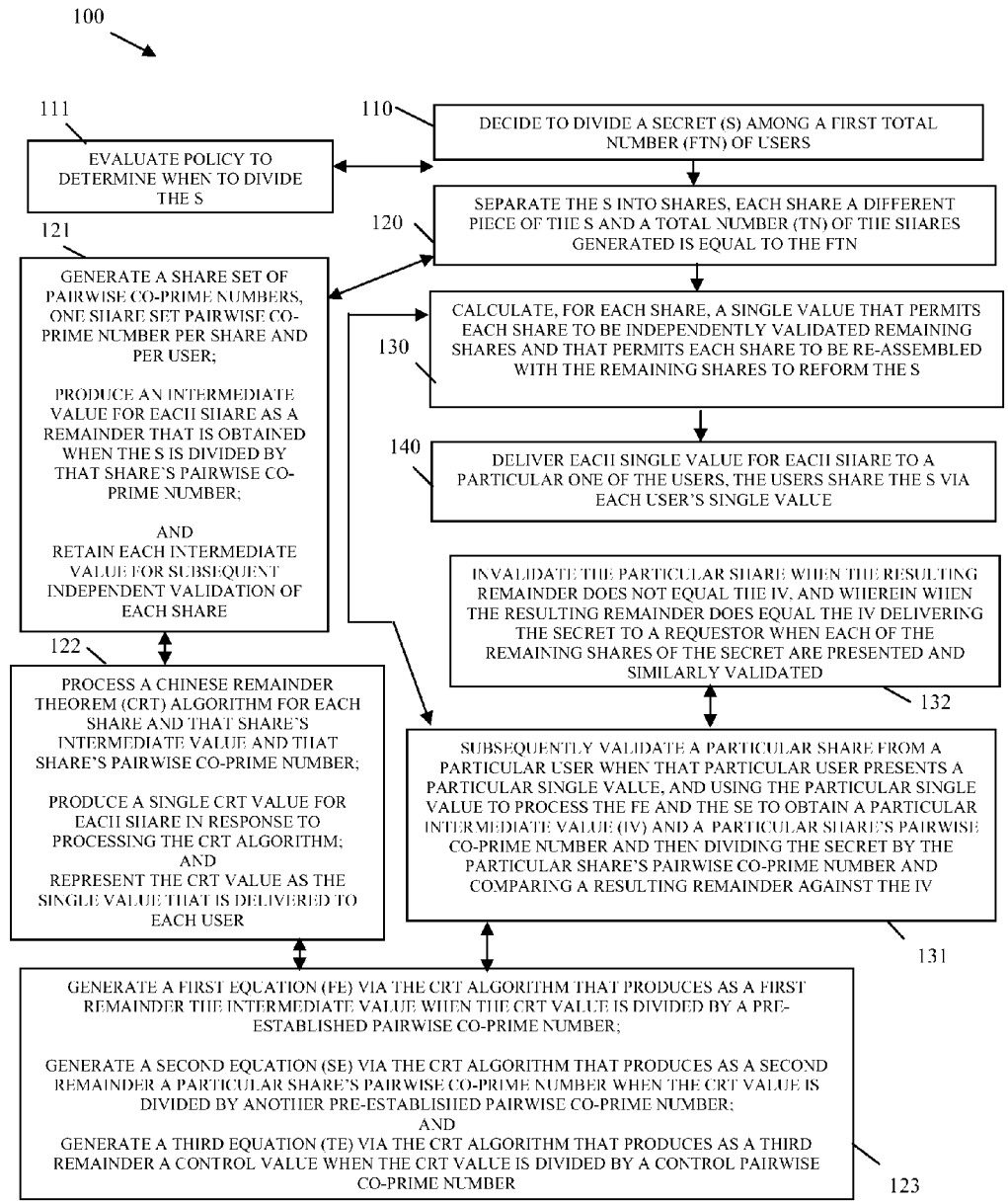
FIG. 1 is a diagram of a method for dividing a shared secret, according to an example embodiment.

FIG. 1 is a diagram of a method 100 for dividing a shared secret, according to an example embodiment. The method 100 (hereinafter "secret dividing service") is implemented in a machine-accessible and readable medium. The secret dividing service is operational over and processes within a network. The network may be wired, wireless, or a combination of wired and wireless.

At 110, the secret dividing service decides to divide a secret among a first total number of users. This can be done for a variety of reasons. For example, at 111, the secret dividing service may evaluate policy to determine when to divide the secret. That is, policy decides when a secret is to be divided among the users. In other cases, an administrator may specifically and manually issue an instruction to divide the secret among the first total number of users (hereinafter referred to as "N").

At 120, the secret dividing service separates the secret into shares or portions. Each share represents a different piece of the secret and a total number of the shares equals to N.

According to an embodiment, at 121, the secret dividing service generates a share of 'n' pairwise co-prime numbers. There is one unique set of 2*m+1 where m=(n−k+1) pairwise co-prime numbers per share of the secret and per user. A number is pairwise co-prime with another number when the only common divisor between the numbers is 1. So, as an example 7 and 10 are pairwise co-prime because the only common divisor for 7 and 10 is 1. Next, the secret dividing service produces an intermediate value for each share as a remainder that is obtained when the secret is divided by the share's pairwise co-prime number. Each intermediate value is then retained for subsequent independent validation of each share when the pieces of the key are presented for re-assembling and validation at some later point in time.

Continuing with the embodiment at 121, and at 122, the secret dividing service processes a Chinese Remainder Theorem (CRT) algorithm for partial set of intermediate value set, and partial set of shared set of pairwise co-prime numbers and a control value for validation using the user's pairwise co-prime set. That is, a single CRT value for each share and each user is produced in response to processing the CRT algorithm. The single value when divided by different pairwise co-prime numbers produce a user's particular intermediate value set, partial set of the shared pairwise co-prime number set and a control value used for validation and discussed in greater detail below.

To do this, at 123, the secret dividing service generates three equations where the first and second sets have 'm' equations and the third set has one equation. The first equation generated via the CRT algorithm produces as a first remainder set, the partial set of intermediate value set when the CRT value is divided by the user's partial set of pairwise co-prime numbers set. The second equation generated via the CRT algorithm produces as a second remainder a partial set of shared pairwise co-prime numbers set when the CRT value is divided by the users other partial set of pairwise co-prime numbers set. The third equation generated via the CRT algorithm produces as a third remainder a control value when the CRT value is divided by the remaining single pairwise co-prime number.

At 130, the secret dividing service calculates for each share a single value the permits each share to be independently validated from remaining shares and that permits each share to be re-assembled with the remaining shares to reform the secret.

According to an embodiment, at 131 that extends the embodiment discussed at 123, the secret dividing service subsequently validates a particular share from a particular user when that particular user presents a particular single value (previously generated CRT value). The secret dividing service uses the particular single value to process the first set of equations and the second set of equations, this renders as remainder values the particular share's intermediate value set and the partial set of shared pairwise co-prime numbers set. The secret is then divided by the derived pairwise co-prime number set and that remainder set is compared against the derived intermediate value set. This recreates a partial set of the shares of the secret.

In some cases, at 132, the secret dividing service invalidates a particular share when the resulting remainder does not equal the intermediate value. When the resulting remainder does equal the intermediate value then the secret is delivered and recreated for a requestor when each of the remaining shares of the secret are presented and similarly validated in the manner discussed herein and above for the particular share that was presented at 131.

At 140, the secret dividing service delivers each single value for each share to a particular one of the users. The users share the secret via each user's single value that each user has and maintains for subsequent presentment and processing when the users desire to recreate the secret.

An example embodiment of the techniques presented above are now presented for further illustration and comprehension of how a CRT algorithm can be used to generate divide a secret and distribute it as shares representing a single value to multiple users. The techniques for validating and reconstructing the shared secret are more completely discussed with reference to the FIG. 2 discussed below.

Chinese Remainder Theorem (CRT) Algorithm Example

The CRT algorithm is implemented in a computer-readable storage medium as instructions that process on a machine of the network to produce values that are used to divide a secret, such as a key, and subsequently validate and reform that key.

Suppose $n_1, n_2, \ldots, n_k$ are integers which are pairwise co-prime. Then, for any given integers $a_1, a_2, \ldots, a_k$, there exists an integer x solving the system of simultaneous congruencies:

$$x \equiv a_1 (\bmod\ n_1)$$
$$x \equiv a_2 (\bmod\ n_2)$$
$$\vdots$$
$$x \equiv a_k (\bmod\ n_k)$$

Furthermore, all solutions x to this system are congruent modulo with the product $N=n_1 n_2 \ldots n_k$.

Processing the Secret Dividing Service

The secret dividing service uses a co-prime set which is fixed for the entire system and is used to share the secret data/keys that need to be shared; so, assume that set as being defined as $CP=\{C_1, C_2, \ldots\}$ and that the set is sufficiently large enough.

Technique to Divide Secret 'D' into 'N Shares:

Say that D is the data that needs to be divided among 'n' users $U_1, U_2, \ldots U_n$.

Step 1: Generate 'n' co-primes $\{P_1, P_2, \ldots P_n\}$ randomly where none of them belongs to CP (defined above).

Step 2: Find $D_1, D_2, \ldots D_n$ such that, $D_i = D \bmod P_i$.

Step 3: This step is done for every user, i.e., for every $U_i$ such that $1<=i<=n$.

Consider a co-prime set $CP_i$ for user $U_i$, such that $CP_i$ is subset of CP and $2m=|CP_i|=2*(n-k+1)$ and say it is represented as $CP_i=\{CP_{(i,1)}, CP_{(i,2)}, \ldots CP_{(i,2m)}\}$ Form a set of equations as below:

$$SD_i \equiv D_{[(i+j-2) \bmod n+1]} (\bmod\ CP_{(i,j)})$$

$$SD_i \equiv P_{[(i+j-2) \bmod n+1]} (\bmod\ CP_{(i,j+m)})$$

$$SD_i \equiv E_i (\bmod\ CP_{validate})$$

where j takes values from 1 to m.

After applying the CRT algorithm on the above set of equations, $SD_i$ is obtained and this is the shared data that is given to the user $U_i$. The last equation in the above set of equations allows the algorithm to find out if user $U_i$ has manipulated his/her shared piece of the secret at the time of rebuilding the secret. Thus, this permits validation (as discussed more completely below with reference to the FIG. 2).

It is now appreciate how a shared secret can be divided in a novel manner and represented as a single CRT value that is then given to each user. The user can subsequently represent the single value for purposes of having that user's share of the secret validated, recreated, and used to reform the entire secret (when every remaining user also presents his/her single value for the secret).

Figure 2:
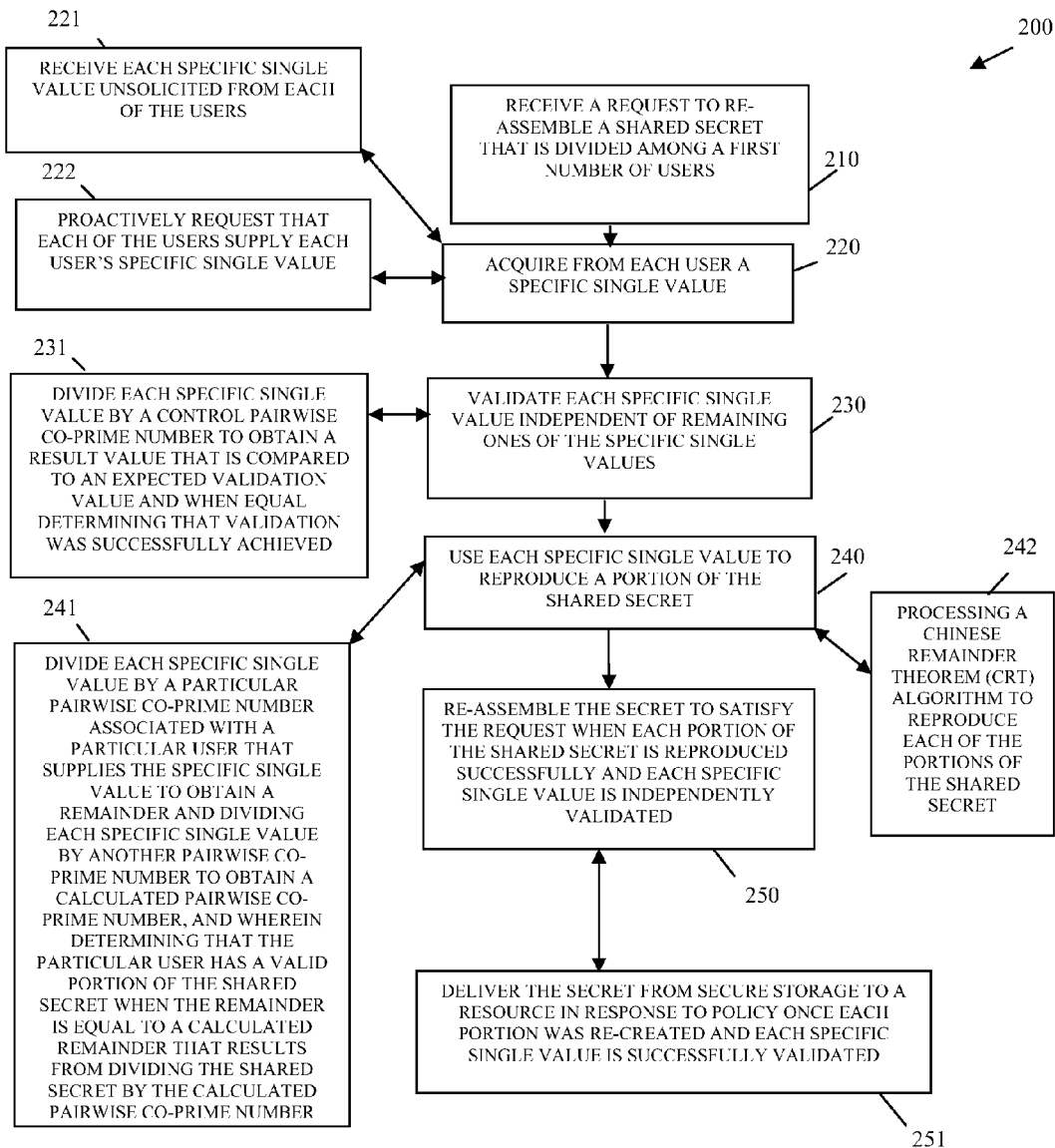
FIG. 2 is a diagram of a method for validating and recreating a shared secret, according to an example embodiment.

FIG. 2 is a diagram of a method 200 for validating and recreating a shared secret, according to an example embodiment. The method 200 (hereinafter "key validation and sharing service" is implemented in a machine-accessible and readable medium and is operational over a network. The network may be wired, wireless, or a combination of wired and wireless.

In an embodiment, the key validation and sharing service represents processing that takes place after a key or secret has been divided and distributed to users in accordance with the process of the secret dividing service represented by the method 100 of the FIG. 1.

At 210, the key validation and sharing service receives a request to re-assemble a shared secret. The shared secret is divided among a first number of users (N).

At 220, the key validation and sharing service acquires from each user a specific single value. The significance and creation of the single numeric value that represents a particular user's portion of the secret was discussed in detail above with reference to the method 100 of the FIG. 1 and the following illustration using a CRT algorithm. The specific single value can be acquired in a variety of manners.

For example, at 221, the key validation and sharing service receives each specific single value in an unsolicited fashion from each of the users that hold a piece of the shared secret.

In another case, at 222, the key validation and sharing service proactively requests that each of the users supply each user's specific single value when policy dictates that the secret be validated and reformulated.

So, the key validation and sharing service can passively acquire each user's specific single value on demand or can proactively and dynamically acquire each user's specific single value in accordance with policy evaluation.

At 230, the key validation and sharing service validates each specific single value independent of remaining ones of the specific single values. So, unlike convention key splitting techniques, the key validation and sharing service validates each individual portion of the secret (e.g., key, etc.) before the secret is reformulated from the individual pieces held by different users.

In an embodiment, at 231, the key validation and sharing service divides each specific single value by a control pairwise co-prime number to obtain a result value that is compared to an expected validation value. When the comparison is equal, the key validation and sharing service determines that the validation for each specific single value was a success.

At 240, the key validation and sharing service uses each specific single value to reproduce a portion of the shared secret. That is, each specific value is used to recreate a specific portion of the shared secret.

In an embodiment, at 241, the key validation and sharing service divides each specific single value by a particular pairwise co-prime number associated with a particular user that supplies the specific single value. This is done to obtain a remainder. Next, each specific single value is divided by another pairwise co-prime number to obtain a calculated pairwise co-prime number. The key validation and sharing service then determines that the particular user has a valid portion of the shared secret when the remainder is equal to a calculated remainder that results from dividing the shared secret by the calculated pairwise co-prime number. An example illustration of this processing is discussed more completely below at the end of the discussion for the FIG. 2.

According to an embodiment, at 242, the key validation and sharing service processes a CRT algorithm to reproduce each of the portions of the shared secret.

At 250, the key validation and sharing service re-assembles the secret to satisfy the request when each portion of the shared secret is reproduced successfully and each specific value presented by each user is independently validated.

In an embodiment, at 251, the key validation and sharing service delivers the secret from secure storage to a resource in response to policy evaluation once each portion of the secret was re-created and each specific single value was successfully validated.

Again, and example illustration of the secret validation processing and the secret reformulation processing is presented within the context of a CRT algorithm.

Condition to Validate the Shares of a Shared Secret

When user $U_i$ comes with his/her piece of shared data $SD_i$, the share is validated against the fixed prime or control prime as follows:

If $SD_i$ mod $CP_{validate}$ is not equal to $E_i$, then the share is not valid, otherwise, it is valid.

Technique to Build the Secret Data D from the Provided 'k' Shared Pieces

Step 1: The shared data received from any 'k' users $\{U_1, U_2, \ldots U_k\}$ is represented as $\{RD_1, RD_2, \ldots RD_k\}$.

Step 2: This step is applied for every user, i.e., for every $U_i$ of the above users set such that $1<=i<=k$. Say $CP_i$ is the co-prime set used for the user $U_i$ and $CP_i = \{CP_{(i,1)}, CP_{(i,2)}, \ldots CP_{(i,2m)}\}$ where $2m=2*(n-k+1)$. (There is no need to remember that this is the set used for a particular user. This can actually be incorporated into the set of CRT equations in the same way as it is done to find the validity of a response.)

Find the set of primes $P_i$ that are generated randomly in the Step 1 and the set $D_i$ that are generated in the Step 2 of the previous algorithm as follows:

$$D_{[(i+j-2) mod\ n+1]} = RD_i\ mod\ CP_{(i,j)}$$

$$P_{[(i+j-2) mod\ n+1]} = RD_i\ mod\ CP_{(i,j+m)}$$

where j takes values from 1 to m.

After applying this step for all the users, the complete set of primes $P_i$ and the set $D_i$ that are used in previous algorithm are obtained.

If the number of shares provided to this algorithm is less than 'k', it does not provide the complete set of primes $P_i$ and the set $D_i$. If the number of shares provided to this algorithm is 'r' which is less than 'n', then, only a partial set of primes $P_i$ and the set $D_i$ of size (r+n−k) are obtained. So, knowledge of any (k−1) or less shares does not allow one to compute the secret 'D' and so one cannot proceed with the step 3.

Step 3: On obtaining the $P_i$ and $D_i$, each of size n, form the set of equations as follows:

$$D \equiv D_i\ mod\ P_i\ for\ 1<=i<=n$$

Solve the above set of equations using CRT for the secret 'D', and thus, the desired shared secret data obtained.

Figure 3:
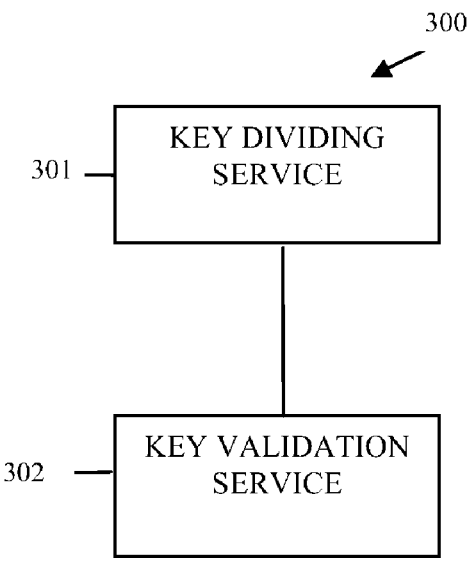
FIG. 3 is a diagram of a secret validation and sharing system, according to an example embodiment.

FIG. 3 is a diagram of a secret validation and sharing system 300, according to an example embodiment. The secret validation and sharing system 300 is implemented in a machine-accessible and readable medium as instructions that process on one or more machines. Moreover, the secret validation and sharing system 300 is operational over a network. The network may be wired, wireless, or a combination of wired and wireless. In an embodiment, the secret validation and sharing system 300 implements, among other things, the methods 100 and 200 of the FIGS. 1 and 2, respectively.

The secret validation and sharing system 300 includes a key dividing service 301 and a key validation service 302. Each of these will now be discussed in turn.

The key dividing service 301 is implemented in a computer-readable storage medium as instructions that process on a machine (processor and memory enabled device, such as a computer). Example processing associated with the key dividing service 301 was presented in detail above with reference to the method 100 of the FIG. 1.

The key dividing service 301 splits a shared key into shares. Each share corresponds to a particular user and a total number of shares is equal to a total number of users. The key dividing service 301 supplies a unique value to each of the users to represent each user's share of the shared key. So, the users hold a token representation of a piece of the key and it is really not a subset of the key, such that the users could not get together and collaborate in an attempt to reformulate the key, since all the users possess just a representative value that is meaningless outside the context of the key dividing service 301 and the key validation service 302.

In an embodiment, the key dividing service 301 processes a CRT algorithm to produce each unique value for each user. The CRT algorithm produces three equations. The first equation provides a particular share of the shared key for a particular user. The second equation provides a pairwise co-prime that when used as a divisor to the shared key produces the particular share of the shared key that is associated with the particular user. The third equation provides a control value that validates each unique value supplied to each user to ensure that no changes have occurred to the unique value. The details of these equations were presented in detail above with reference to the method 100 and the FIG. 1.

The key validation service 302 is implemented in a computer-readable storage medium as instructions that process on the same machine as the key dividing service 301 or that process on a different machine of the network. Example processing associated with the key validation service 302 was presented in detail above with reference to the method 200 and the FIG. 2.

The key validation service 302 validates each unique value presented by each user and reconstructs each share of the shared key from each unique value. Also, the key validation service 302 reproduces the shared key when a configurable number of shares (K) is successfully reconstructed and validated.

According to an embodiment, the key validation service 302 processes a CRT algorithm to validate each unique value and to reconstruct each share of the shared key. Again, the details of this were presented above with reference to the method 200 of the FIG. 2.

Moreover, the key validation service 302 is configured such that it is unable to reconstruct the shared key when less than the total number of shares is received for processing. So, each share of the shared key has to be validated and presented to the key validation service 302 before the shared key is reproduced and delivered.

In an embodiment, the key validation service 302 completely reconstructs the shared secret for each unique value but that shared secret is not supplied to a requester unless the total number of unique values are received representing the total number of shares and that shared secret is not supplied to the requestor unless each and every share is validated via its unique value supplied by its user.

Figure 4:
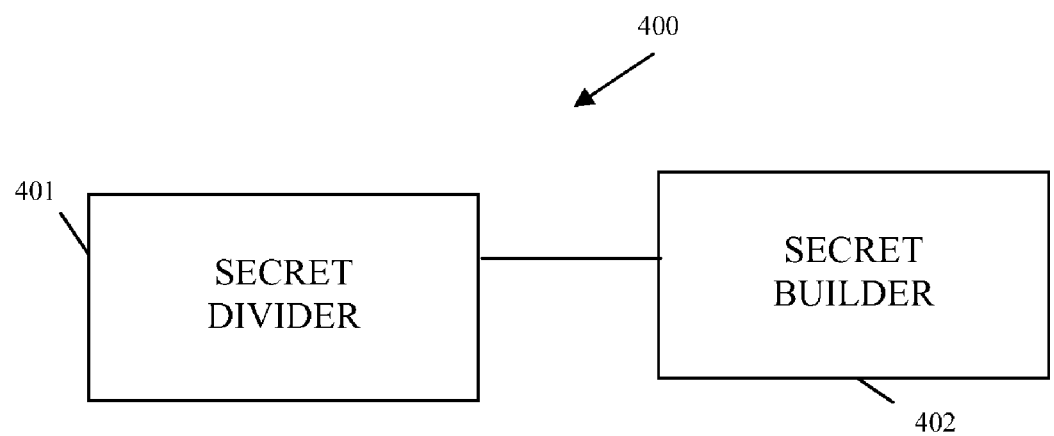
FIG. 4 is a diagram of another secret validation and sharing system, according to an example embodiment.

FIG. 4 is a diagram of another secret validation and sharing system 400, according to an example embodiment. The secret validation and sharing system 400 is implemented in a machine-accessible and computer-readable storage medium and is processed on machines by services of a network. The network may be wired, wireless, or a combination of wired and wireless.

The secret validation and sharing system 400 includes a secret divider 401 and a secret builder 402. Each of these and their interactions with one another will now be discussed in turn.

The secret divider 401 is implemented as instructions on a computer-readable storage medium and the instructions are processed on a machine, such as a computer. The processing associated with the secret divider 401 was presented above with reference to the method 100 of the FIG. 1 and with reference to the system 300 of the FIG. 3.

The secret divider 401 divides a secret into portions. Each portion corresponds to a user and each portion is represented by the secret divider 401 as a unique value. Each unique value is supplied to a particular one of the users.

The secret builder 402 is implemented as instructions on a computer-readable storage medium and processes on the same machine as the secret divider 401 or on an entirely different machine of the network from that which is associated with the secret divider 401. Processing associated with the secret builder 402 was presented in detail above with reference to the method 200 of the FIG. 2 and with reference to the system 300 of the FIG. 3.

The secret builder 402 receives each unique value (distributed by the secret divider 401 to particular users) and recreates each portion of the shared secret that corresponds to that particular unique value. When the secret builder 402 receives all portions of the shared secret (via the unique values from the users) and when all portions are validated, the secret builder 402 reproduces the secret.

According to an embodiment, both the secret divider 401 and the secret builder 402 process a CRT algorithm to divide, validate, and reproduce/redeliver the shared secret. To do this, the secret divider 401 and the secret builder 402 maintain and manage two sets of pairwise co-prime numbers with the CRT algorithm for use in dividing, validating, and reproducing/redelivering the shared secret. These sets of pairwise co-primes were described and presented in detail above with reference to the illustrations that followed the discussions of the FIGS. 1 and 2.

In some cases, at least one of the two sets of pairwise co-prime numbers are randomly generated as part of a configuration associated with configuring the secret divider 401 and the secret builder 402.

It is now appreciated how key splitting can occur in a more secure manner using single distributed values that can be used to perform validation and reformation of the key pieces and can be used to reform the shared key. In some specific cases this is beneficially achieved using CRT-based algorithms.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method residing in a non-transitory computer-readable medium and for execution on a processing device, comprising:

deciding, by the processing device, to divide a secret among a first total number of users;

separating, by the processing device, the secret into shares, each share a different piece of the secret and a total number of the shares generated is equal to the first total number, separating further includes: generating a share set of pairwise co-prime numbers, one share set pairwise co-prime number per share and per user; producing an intermediate value for each share as a remainder that is obtained when the secret is divided by that share's pairwise co-prime number; and retaining each intermediate value for subsequent independent validation of each share;

producing an intermediate value for each share as a remainder that is obtained when the secret is divided by that share's pairwise co-prime number; and retaining each intermediate value for subsequent independent validation of each share; calculating, on the processing device and for each share, a single value that permits each share to be independently validated from remaining shares and that permits each share to be re-assembled with the remaining shares to reform the secret, the calculating further includes: processing a Chinese Remainder Theorem (CRT) algorithm for each share and that share's intermediate value and that share's pairwise co-prime number; producing a single CRT value for each share in response to processing the CRT algorithm; and representing the CRT value as the single value that is delivered to each user and processing the CRT algorithm further includes: generating a first equation via the CRT algorithm that produces as a first remainder the intermediate value when the CRT value is divided by a pre-established pairwise co-prime number; generating a second equation via the CRT algorithm that produces as a second remainder a particular share's pairwise co-prime number when the CRT value is divided by another pre-established pairwise co-prime number; and generating a third equation via the CRT algorithm that produces as a third remainder a control value when the CRT value is divided by a control pairwise co-prime number; and delivering, by the processing device, each single value for each share to a particular one of the users, wherein the users share the secret via each user's single value.

2. The method of claim 1, wherein deciding further includes evaluating policy to determine when to divide the secret.

3. The method of claim 1, wherein calculating further includes subsequently validating a particular share from a particular user when that particular user presents a particular single value, and using the particular single value to process the first equation and the second equation to obtain a particular intermediate value and a particular share's pairwise co-prime number and then dividing the secret by the particular share's pairwise co-prime number and comparing a resulting remainder against the particular intermediate value.

4. The method of claim 3 further comprising, invalidating the particular share when the resulting remainder does not equal the particular intermediate value, and wherein when the resulting remainder does equal the particular intermediate value delivering the secret to a requestor when each of the remaining shares of the secret are presented and similarly validated.

5. A machine-implemented system, comprising:

a key dividing service implemented in a non-transitory computer-readable storage medium as instructions that process on a machine; and a key validation service implemented in a non-transitory computer-readable storage medium as instructions that process on the machine or a different machine of a network;

wherein the key dividing service splits a shared key into shares, each share corresponds to a particular user and a total number of shares is equal to a total number of the users, and wherein the key dividing service supplies a unique value to each of the users to represent each user's share, and wherein the key validation service validates each unique value and reconstructs each share from each unique value and the key validation service reproduces the shared key when each share is successfully reconstructed and validated, wherein the key dividing service processes a Chinese Remainder Theorem (CRT) algorithm to produce each unique value for each user, and wherein the CRT algorithm produces three equations for each unique value, a first equation provides a particular share of the shared key, a second equation provides a pairwise co-prime that when used as a divisor to the shared key produces the particular share, and a third equation provides a control value that validates each unique value to ensure no changes have occurred.

6. The system of claim 5, wherein the key validation service processes a Chinese Remainder Theorem (CRT) algorithm to validate each unique value and to reconstruct each share of the shared key.

7. The system of claim 5, wherein the key validation service is unable to reconstruct the shared key when less than the total number of shares are received for processing.

8. The system of claim 5, wherein the shared secret is completely reconstructed by the key validation service for each unique value but is not supplied to a requestor unless the total number of unique values are received representing the total number of shares and is not supplied to the requestor unless each share is validated via each unique value.

* * * * *